United States Patent
Bielby et al.

(10) Patent No.: US 12,066,947 B2
(45) Date of Patent: Aug. 20, 2024

(54) OPTIMIZATION OF QUALITY OF SERVICE OF DATA STORAGE DEVICES

(71) Applicant: Micron Technology, Inc., Boise, ID (US)

(72) Inventors: Robert Richard Noel Bielby, Placerville, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 1119 days.

(21) Appl. No.: 16/791,851

(22) Filed: Feb. 14, 2020

(65) Prior Publication Data
US 2021/0256349 A1    Aug. 19, 2021

(51) Int. Cl.
*G06F 12/02*     (2006.01)
*G06F 12/0868*   (2016.01)
*G06N 3/049*     (2023.01)

(52) U.S. Cl.
CPC ...... *G06F 12/0868* (2013.01); *G06F 12/0253* (2013.01); *G06N 3/049* (2013.01); *G06F 2212/1016* (2013.01)

(58) Field of Classification Search
CPC .. G06F 12/08; G06F 12/0868; G06F 12/0253; G06F 12/02; G06F 2212/601; G06F 2212/1041; G06F 2212/1016; G06N 3/088

See application file for complete search history.

(56) References Cited

U.S. PATENT DOCUMENTS

| 10,948,966 B1* | 3/2021 | Rotem | G06N 3/10 |
| 10,992,557 B1* | 4/2021 | Matthews | H04L 43/062 |
| 2017/0031816 A1* | 2/2017 | Lee | G06F 3/0661 |
| 2018/0284737 A1 | 10/2018 | Cella et al. | |
| 2018/0357535 A1* | 12/2018 | Shulkin | G11C 16/28 |
| 2019/0129405 A1* | 5/2019 | Cella | G05B 23/024 |
| 2020/0133845 A1* | 4/2020 | Kim | G06F 12/0246 |

(Continued)

FOREIGN PATENT DOCUMENTS

WO    WO-2019152220 A1 *    8/2019 ......... G06F 12/0246

OTHER PUBLICATIONS

I. Ahmad et al., "Machine Learning Meets Communication Networks: Current Trends and Future Challenges," in IEEE Access, vol. 8, pp. 223418-223460, 2020.*

(Continued)

*Primary Examiner* — Pierre Michel Bataille
(74) *Attorney, Agent, or Firm* — Greenberg Traurig

(57) ABSTRACT

Systems, methods and apparatuses to control quality of service of a data storage device. For example, the data storage device receives an input data stream and provides an output data stream. Based at least in part on the input data stream and/or the output data stream, the data storage device determines a quality of service configuration using an artificial neural network. A controller of the data storage device uses the quality of service configuration to control operations of the data storage device that are relevant to quality of service of the data storage device. For example, the configuration identifies optimized strategies and parameters of caching or buffering, and optimized timing and frequency of background maintenance processes, such as garbage collection, wear leveling, etc.

20 Claims, 10 Drawing Sheets

(56) References Cited

U.S. PATENT DOCUMENTS

2020/0311537 A1* 10/2020 Franca-Neto .......... G06N 3/084
2020/0356292 A1* 11/2020 Ippatapu ............. G06F 11/1453
2022/0050593 A1*  2/2022 Kim ................... G06F 12/0246

OTHER PUBLICATIONS

M. Capra, B. Bussolino, A. Marchisio, G. Masera, M. Martina and M. Shafique, "Hardware and Software Optimizations for Accelerating Deep Neural Networks: Survey of Current Trends, Challenges, and the Road Ahead," in IEEE Access, vol. 8, pp. 225134-225180, 2020.*

S. Yao et al., "Eugene: Towards Deep Intelligence as a Service," 2019 IEEE 39th International Conference on Distributed Computing Systems (ICDCS), Dallas, TX, USA, 2019, pp. 1630-1640.*

\* cited by examiner

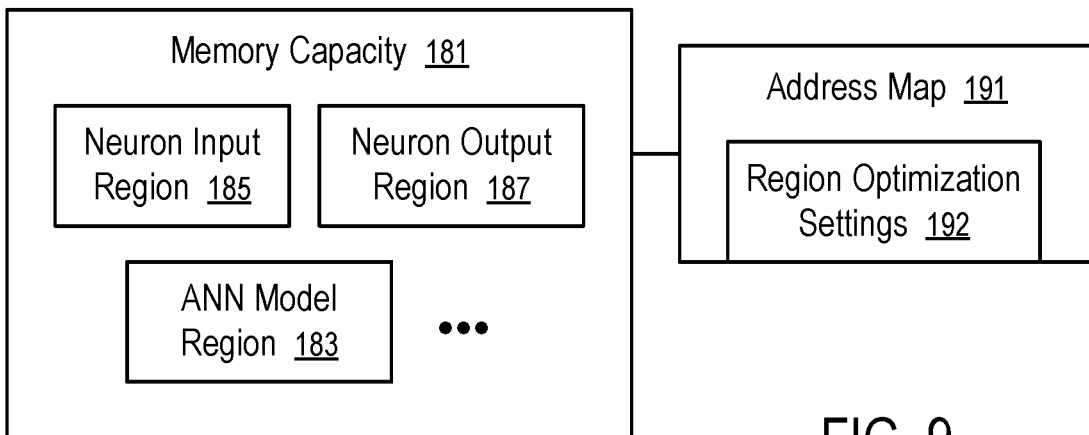
FIG. 9
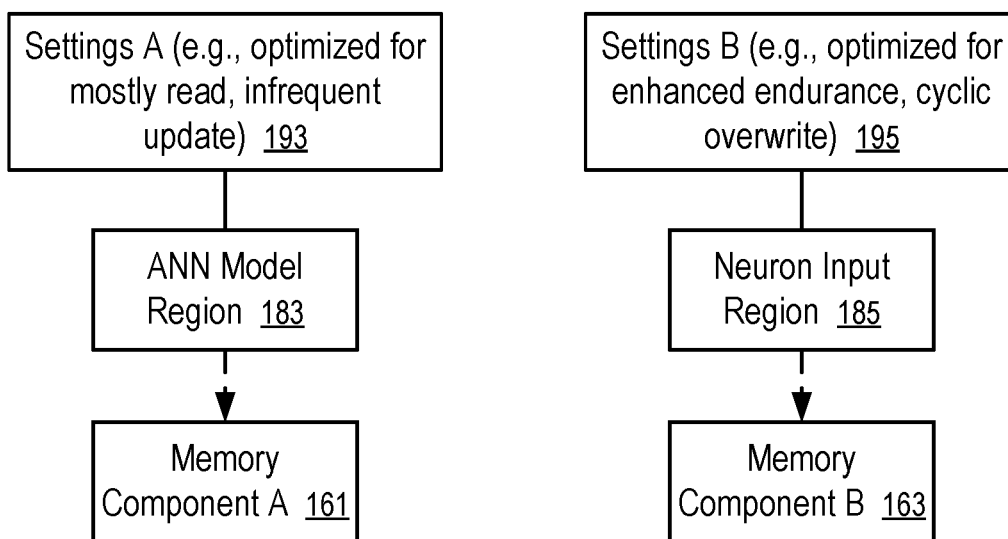
FIG. 10
FIG. 11
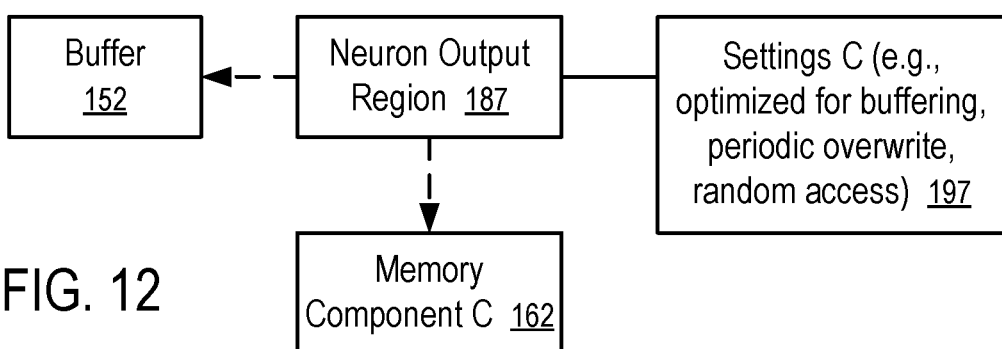
FIG. 12

OPTIMIZATION OF QUALITY OF SERVICE OF DATA STORAGE DEVICES

FIELD OF THE TECHNOLOGY

At least some embodiments disclosed herein relate to quality of service of data storage devices in general and more particularly, but not limited to, storage devices in autonomous vehicles.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

FIG. 9 shows a memory capacity configured to support neural network computations according to one embodiment.

FIG. 10 illustrates the configuration of a memory region for an Artificial Neural Network (ANN) model according to one embodiment.

FIG. 11 illustrates the configuration of a memory region for the inputs to artificial neurons according to one embodiment.

FIG. 12 illustrates the configuration of a memory region for the outputs from artificial neurons according to one embodiment.

DETAILED DESCRIPTION

Figure 1:
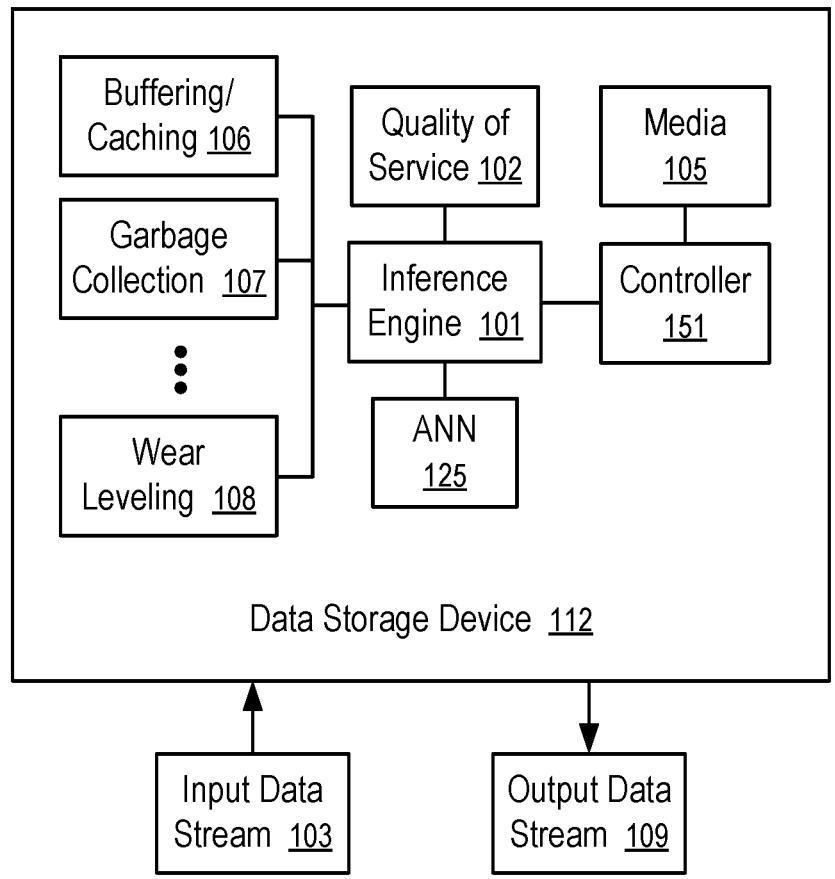
FIG. 1 shows a data storage device having an inference engine configured to adjust the operations and configurations of the data storage device for improved quality of service according to one embodiment.

At least some embodiments disclosed herein provide systems, methods and apparatus to optimize quality of service of a data storage device configured in a motor vehicle, or another vehicle, with or without an Advanced Driver Assistance System (ADAS).

The data storage device can have various configurable parameters and operations that have different impacts on the quality of service of the data storage device under various conditions. Quality of Service (QOS) of the data storage can be measured based on the latency (response time) for read/write (input/output) requests, and/or the number of read/write (input/output) requests that the data storage device processes per unit of time.

For example, the data storage device can implement different caching or buffering schemes and/or use caching parameters of different values in implementing caching/buffering, such as cache size, cache block size, cache set size, number of cache sets, etc. Different caching/buffering implementations can be optimal for different patterns of workloads applied on the data storage device.

For example, the data storage device can have background maintenance processes, such as garbage collection, wear leveling, etc. In a garbage collection process, the data storage device searches for pages of storage media that have been marked as stale, relocates valid data of pages that are in the same blocks as the stale pages, and erases the blocks to make the blocks ready for write operations. In a wear leveling operation, the data storage device moves data from a more frequently erased page to a less frequently erased page. Different ways to schedule the timing and frequency of the background maintenance processes can have different impacts on the quality of service of the data storage device with different patterns of workloads applied on the data storage device.

An Artificial Neuron Network (ANN) (e.g., Spiking Neural Network (SNN), Convolutional Neural Network (CNN), Recurrent Neural Network (RNN)) can be configured to predict, for the current operating condition of the data storage device, the configurations of the caching/buffering and background maintenance processes to optimize the quality of service of the data storage device. For example, the ANN can be configured to predict the combination of a caching/buffering implementation and the timing and frequency of garbage collection and wear leveling such that the quality of service of the data storage device is optimized for a subsequent time period of operations.

For example, the data storage device can be configured as a Solid State Drive (SSD) in an autonomous vehicle. Based on the data access patterns indicated by the operating status of the vehicle, the processing status/milestone/workload of the Advanced Driver Assistance Systems (ADAS), applications that requested access, access types (e.g., read/write), access frequency, address locations, chunk sizes, etc., the ANN can predict the scheme and parameters of caching/buffering and the timing and frequency of background maintenance processes to optimize the quality of service of the SSD.

The ANN can be configured to be self-trained within the data storage device. For example, the ANN can self-organize input data to gain prediction/classification capability (e.g., using an unsupervised learning technique). Alternatively, the ANN can be trained using a supervised learning technique to refine or establish a prediction model.

For example, the current operating parameters of the vehicle, applications, and/or the data storage device can be provided as input to the ANN to derive the preferred cache scheme and the optimized background maintenance schedule. Subsequent changes in the quality of service of the data storage device can be measured as a result of changing in caching/buffering aspects and in the timing and frequency of background maintenance processes. The measurements of quality of service and the implemented parameters of caching/buffering and background maintenance processes can be used input data for unsupervised learning. Alternatively, the measurements of quality of service can be used as labels for predictions to train the ANN using a supervised learning technique.

By using the ANN to control the aspects (e.g., buffering/caching, garbage collection, wear leveling) that have impact on the quality of service of the data storage device, the data storage device can have consistent quality of service regardless of the usage scenarios in the field.

FIG. 1 shows a data storage device (112) having an inference engine (101) configured to adjust the operations and configurations of the data storage device (112) for improved quality of service (102) according to one embodiment.

The data storage device (112) stores a model of an Artificial Neural Network (ANN) (125). The inference engine (101) uses the ANN (125) to predict parameters and configurations of operations of the data storage device (112), such as buffering/caching (106), garbage collection (107), wear leveling (108), etc. to optimize the measured quality of service (102) of the data storage device (112).

The data storage device (112) has a controller (151) and media (105) configured to store data provided to the data storage device (112). For example, the media (105) can include integrated circuit memory cells; and the integrated circuit memory cells can be non-volatile memory (e.g., NAND, FERAM, NOR, PCM, MRAM, cross point memory). For example, an input data stream (103) provides data to be written into the media (105) of the data storage device (112); and an output data stream (109) provides data retrieved from the data storage device (112). The controller (151) processes commands provided in connection with the input data stream (103) and the output data stream (109) and write data into the media (105) and read data from the media (105) according to the commands. When the methods and techniques described therein (e.g., the method of FIG. 16) are implemented at least in part via instructions executed via a programmable device (e.g., the inference engine (101) and/or the controller (151)), the instructions can be stored in the media (105), or another machine readable media.

The controller (151) can buffer/cache data for the input data stream (103) and/or the output data stream using memory that is faster than the media (105). For example, the controller (151) can cache or buffer data using Static Random-Access Memory (SRAM) of the controller (151), and/or a separate Dynamic Random-Access Memory (DRAM).

The parameters and configurations of buffering/caching (106) performed by the controller can be calculated by the inference engine (101) using the ANN (125) based on the input data stream (103) and/or the output data stream (109). Patterns in the input data stream (103) and/or the output data stream (109) corresponding to typical usage scenarios of the data storage device (112) can be identified via the ANN (125) to determine the parameters and configurations of buffering/caching (106) to optimize the quality of service (102) measured for the data storage device (112).

Similarly, the controller (151) can perform background maintenance operations, such as garbage collection (107), wear leveling (108), etc. The timing and frequency of the background maintenance operations can impact the quality of service (102) of the data storage device (112). The inference engine (101) uses the ANN (125) to determine the timing and frequency of the maintenance operations (e.g., 107, 108) to optimize the quality of service (102) measured for the data storage device (112), based on the patterns in the input data stream (103) and/or the output data stream (109).

Figure 2:
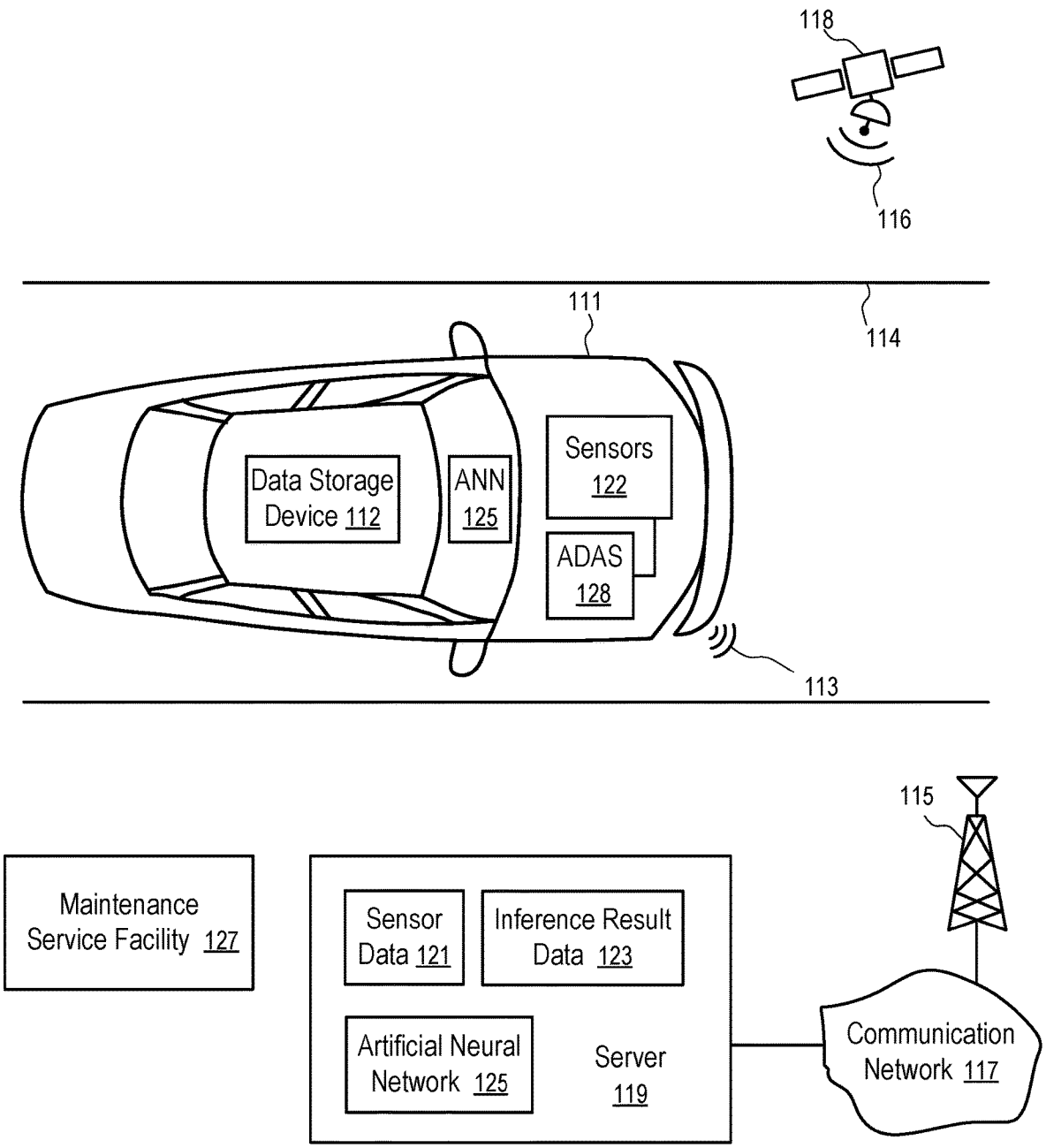
FIG. 2 shows a system having a vehicle configured to collect and process sensor data according to some embodiments.

For example, the data storage device (112) can be configured in a vehicle illustrated in FIG. 2; and the inference engine (101) can predict the parameters and configurations of buffering/caching (106) and the timing and frequency of the background maintenance operations (e.g., 107 and 108) based on the operating patterns of the vehicle.

FIG. 2 shows a system having a vehicle (111) configured to collect and process sensor data according to some embodiments.

The vehicle (111) in FIG. 2 has a data storage device (112), sensors (122), an ANN (125), and an ADAS (128) configured to process sensor data, including inputs from the sensors (122), to generate control signals for the vehicle (111). For example, the data storage device (112) in FIG. 2 can be implemented using the data storage device (112) illustrated in FIG. 1.

In general, one or more sensors (e.g., 122) can be configured on the vehicle (111) to generate sensor data input to the ADAS (128) and/or the data storage device (112). The data storage device (112) and/or the ADAS (128) can be configured to use the ANN (125) to generate inference results. The inference results can include a control signal for operating or driving the vehicle (111), a suggestion for a maintenance service of the vehicle (111), etc.

In some implementations, at least a portion of the data generated by the sensors (e.g., 122) is used in both the ADAS (128) for driver assistance and in the ANN (125) for maintenance prediction. Optionally, the output of the ANN (124) can be used in both the data storage device (112) and in the ADAS (128). The ANN (125) can be part of the ADAS (128).

The sensors (122) can be configured in a digital camera, lidar, radar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (122) can be configured primarily to monitor the environment of the vehicle (111); and other sensors (122) can be configured primarily to monitor the operating condition of one or more component of the vehicle (111), such as an internal combustion engine, an exhaust system, an electric motor, a brake, a tire, a battery, etc.

The ANN (125) of the vehicle (111) is configured to process the sensor input data from the sensors (122) to control the vehicle (111) and/or the data storage device (112).

In general, the outputs of the sensor(s) (122) as a function of time are provided as a sensor data stream to the ADAS (128) and/or the ANN (125) to provide driver assistance (e.g., autonomous driving) and maintenance prediction.

At least a portion of the sensor data stream can be provided to the data storage device (112) for storing and/or for processing. For example, a portion of the ANN (125) can be implemented in the data storage device (112). The inference engine (101) of the data storage device (112) can process the sensor data stream to generate inference results for further processing by the ADAS (128). Thus, the input data stream (103) to the data storage device (112) can include at least a portion of the sensor data stream from the sensors (122); and the output data stream (109) can include inference results generated using the ANN (125) in the data storage device (112) for the ADAS (128) of the vehicle (111). The operating condition of the vehicle (111) and thus the workload of the data storage device (112) can be determined from the patterns in the input/output data streams (103 and 109). The operating condition can be used to predict the optimized parameters and configurations of buffering/caching (106) and the optimized timing and frequency of background maintenance operations (e.g., 107 and 108).

The ANN (125) of the vehicle (111) and/or in the data storage device (112) can include an SNN configured to classify time-based variations of sensor data and/or detect deviation from known patterns of sensor data of the vehicle (111). When the ANN (125) detects the deviation from known patterns, the sensor data corresponding to the deviation can be stored in the data storage device (112) for further analysis and/or for further training of the ANN (125).

The data storage device (112) of the vehicle (111) can be configured to record sensor data for a period of time. The recorded sensor data can be used in the ANN (125) for predictive maintenance and/or used to further train the ANN (125). The maintenance service facility (e.g., 127) can download the sensor data (121) from the data storage device (112) and provide the sensor data (121) and the corresponding inference result data (123) to the server (119) to facilitate the training of the ANN (125).

Optionally, or in combination, the data storage device (112) is configured with a machine learning module to customize and/or train the ANN (125) installed in the vehicle (111) and/or in the data storage device (112).

The vehicle (111) can have a wireless communication device to communicate with a remote server (119) via wireless signals (113) and a communication network (117). The remote server (119) is typically configured at a location away from a road (114) on which the vehicle (111) is in service. For example, the vehicle (111) may provide some sensor data (121) to the server (119) and receive update of the ANN (125) from the server (119).

The communication network (117) can be a cellular phone network having one or more base stations (e.g., 115) to receive the wireless signals (e.g., 113). Alternatively, or in combination, the communication network (117) can include the Internet, where the wireless local area network signals (e.g., 113) transmitted by the vehicle (111) is received in an access point (e.g., 115) for further communication to the server (119). In some implementations, the vehicle (111) uses a communication link (116) to a satellite (118) or a communication balloon to communicate with the server (119).

The server (119) can also communicate with one or more maintenance service facilities (e.g., 127) to receive the sensor data (121) and/or the desired inference result data (123) of vehicles (e.g., 111).

For example, the desired inference result data (123) can be generated by a human operator inspecting the sensor data (121) (e.g., images from the sensors (122)) and/or relevant conditions of the vehicle (111). For example, the desired inference result data (123) can include inspection records and/or service records of components of the vehicles (e.g., 111). For example, the inspection records and/or service records can indicate the degree of wear and tear of components inspected during their services at the maintenance service facilities (e.g., 127), the identification of failed or malfunctioning components, etc. The sensor data (121) of the vehicles (e.g., 111) obtained in a time period relevant to the desired inference result data (123) can be used to train an ANN (125) at the server (119) to improve inference capability of the ANN (125).

The updated ANN (125) can be installed in the vehicle (111) at the maintenance service facility (127). Alternatively, the updated ANN (125) can be transmitted to the vehicle (111) to update the vehicle (111) over the air.

A portion of the ANN (125) responsible for the processing of input from the sensors (122) can be configured in the data storage device (112). The inference engine (101) of the data storage device (112) processes the inputs from the sensors (122) to generate the inference results transmitted from the data storage device (112) to the ADAS (128). Based on the input from the sensors (122) and/or the inference results to the ADAS (128), the inference engine (101) data storage device (112) can generate inference results to optimize the quality of service (102) of the data storage device (112) in processing the input data stream (103) and the output data stream (109), by adjusting the operations of buffering/caching (106), garbage collection (107), wear leveling (108), etc.

Figure 3:
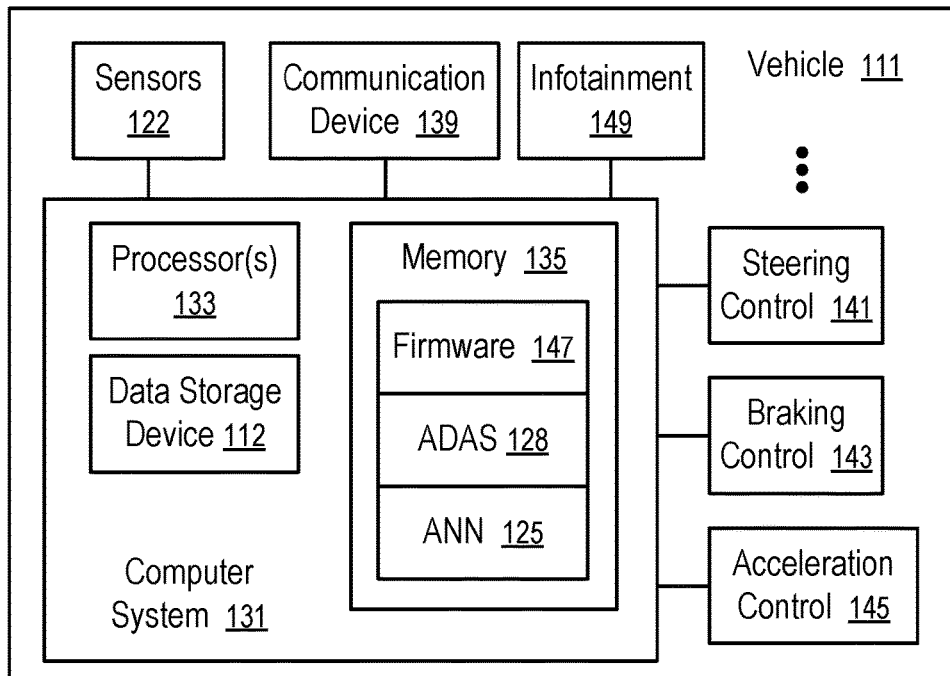
FIG. 3 shows an autonomous vehicle according to one embodiment.

FIG. 3 shows an autonomous vehicle (111) according to one embodiment.

For example, the vehicle (111) in the system of FIG. 2 can be implemented using the autonomous vehicle (111) of FIG. 3.

In general, the vehicle (111) can include an infotainment system (149), a communication device (139), one or more sensors (122), and a computer system (131) that is connected to some controls of the vehicle (111), such as a steering control (141) for the direction of the vehicle (111), a braking control (143) for stopping of the vehicle (111), an acceleration control (145) for the speed of the vehicle (111), etc. In some embodiments, the vehicle (111) in the system of FIG. 2 has a similar configuration and/or similar components.

The vehicle (111) of FIG. 3 is configured with an Advanced Driver Assistance System (ADAS) (128). The ADAS (128) of the vehicle (111) can have an Artificial Neural Network (ANN) (125) for object detection, recognition, identification, and/or classification, based on images generated in the sensors (122). A portion of the ANN (125) can be implemented in the data storage device (112) of FIG. 1.

The computer system (131) of the vehicle (111) can include one or more processors (133), a data storage device (112), and memory (135) storing firmware (or software) (147), including the computer instructions and data models for ADAS (128).

Sensors (122) of the vehicle (111) can include a visible light camera, an infrared camera, a lidar, radar, or sonar system, a peripheral sensor, a Global Positioning System (GPS) receiver, a satellite positioning system receiver, a brake sensor, and/or an airbag sensor. Further, the sensors (122) of the vehicle (111) can include audio sensors (e.g., microphone) configured to monitor noises from various components and locations in the vehicle (111), a vibration sensor, a pressure sensor, a force sensor, a stress sensor, and/or a deformation sensor configured to measure loads on a component of the vehicle (111), accelerometers and/or gyroscope sensors measuring the motions of some components of the vehicle (111), etc. Such sensors can be used to monitor the operating status and/or health of the components for predictive maintenance.

The sensors (122) can provide a stream of real time sensor data to the computer system (131). The sensor data generated by sensors (122) of the vehicle (111) can include an image that captures an object using a camera that images using lights visible to human eyes, or a camera that images using infrared lights, or a sonar, radar, or LIDAR system. Preferably, the image is processed by the inference engine (101) of the data storage device (112) to generate inference results as the output data stream (109) of the data storage device (112) and thus reduce the computation workload of the main computer system (131).

For example, a camera can be used to obtain roadway information for the travel of the vehicle (111), which can be processed by the ANN (125) to generate control signals for the vehicle (111). For example, a camera can be used to monitor the operation state/health of a component of the vehicle (111), which can be processed by the ANN (125) to predict or schedule a maintenance service.

The infotainment system (149) of the vehicle (111) can be used to present data and/or inference results from the sensors (122). For example, compressed images with reduced resolution and refreshing frequency can be generated in the sensors (122) and transmitted to the infotainment system (149) for presentation to an occupant of the vehicle (111). Optionally, the communication device (139) can establish a connection to a mobile device of an occupant of the vehicle (111) to make the presentation.

When the vehicle (111) is configured with an ADAS (128), the outputs of the ADAS (128) can be used to control (e.g., 141, 143, 145) the acceleration of the vehicle (111), the speed of the vehicle (111), and/or the direction of the vehicle (111), during autonomous driving.

Figure 4:
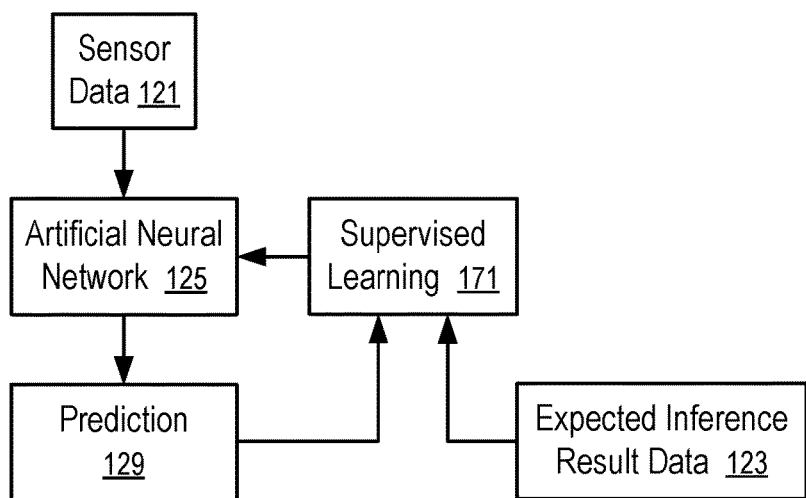
FIGS. 4-6 illustrate training of artificial neural networks for prediction according to some embodiments.
Figure 5:
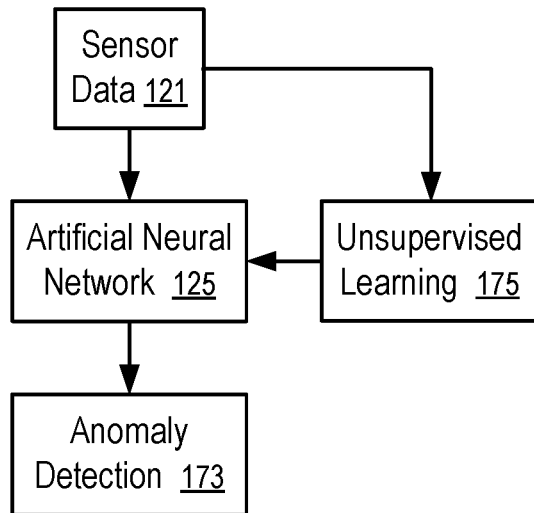
Figure 6:
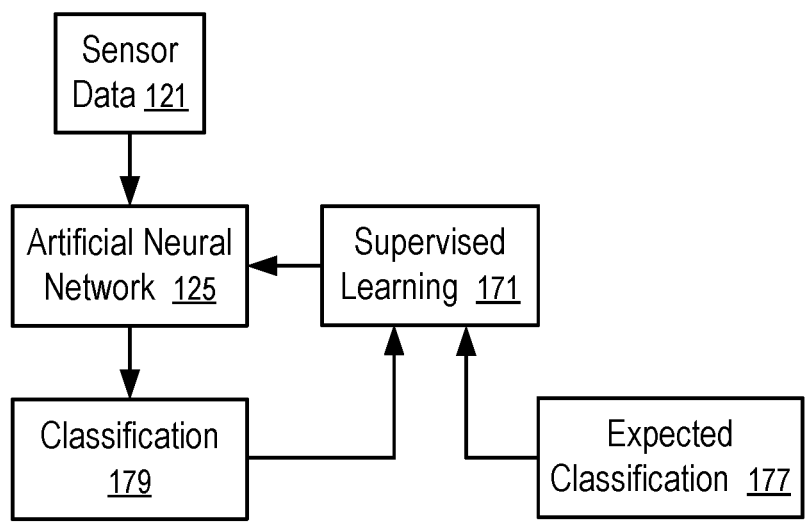

FIGS. 4-6 illustrate training of artificial neural networks (125) for prediction according to some embodiments.

In FIG. 4, a module (171) of supervised machine learning is used to train an artificial neural network (125) to minimize the differences between the prediction (129) generated from the sensor data (121) and the desired inference result data (123).

For example, the sensor data (121) can include an image showing an object; and the desired/expected inference result data (123) can identify an image region occupied by the object, a feature of the object, a classification of the object, an identity of the object, etc.

For example, the sensor data (121) can include an image surrounding of the vehicle (111); and the desired/expected inference result data (123) can include preferred control inputs for the steering control (141), the braking control (143), and the acceleration control (145).

The desired/expected inference result data (123) can be generated by a human operator. For example, the sensor data (121) can be used to construct a virtual reality demonstration of a situation encountered by the vehicle (111), including images from the sensors (122) showing an environment of the vehicle (111); and the desired/expected inference result data (123) can include responses generated by a human operator responsive to the virtual reality demonstration of the situation.

The supervised machine learning module (171) can adjust the artificial neural network (125) to reduce/minimize the difference between the prediction (129) generated based on the sensor data (121) and the desired/expected inference result data (123) generated by a human operator.

The supervised learning (171) of FIG. 4 can be applied in the server (119) based on the sensor data of a population of vehicles and corresponding desired/expected inference result data (123) to generate a generic ANN for the population of the vehicles.

The supervised learning (171) of FIG. 4 can be applied in the vehicle (111) based on the sensor data of the vehicle and inference result data (123) to generate a customized/personalized ANN (125). For example, a generic ANN (125) can be initially used in the vehicle (111); and the sensor data of the vehicle (111) and desired/expected inference result data (123) specific to the vehicle (111) can be used to further train the ANN (125) of the vehicle for customization/personalization of the ANN (125) in the vehicle (111).

In FIG. 5, a module (175) of unsupervised machine learning is used to train or refine an artificial neural network (125) to facilitate anomaly detection (173). The unsupervised machine learning module (175) is configured to adjust the ANN (e.g., SNN) to generate the normal classification, clustering, or recognized patterns in the sensor data (121) such that a degree of deviation from the normal classification, clustering, or recognized patterns in the sensor data (121) can be used to signal the detection (173) of anomaly.

For example, anomaly detection (173) can be used to preserve the sensor data (121) associated with anomaly for further analysis. In response to anomaly detection (173) in the vehicle (111), the computer system (131) can issue read command to the sensors (122) to retrieve image data associated with the anomaly from the sensors (122) and store the retrieved image data in the data storage device (112). The image data associated with the anomaly can be temporarily preserved in the memory device of the sensors (122) and loaded to the data storage device (112) over a period of time using available communication bandwidth between the sensors (122) and the data storage device (112) without impacting the normal operations of the ADAS (128).

When the vehicle (111) is in the maintenance service facility (127), the image data (and other sensor data) associated with the anomaly can be retrieved from the data storage device (112) to generate desired/expected inference result data (123) for further training of the ANN (125) using a supervised learning (171) of FIG. 4.

Optionally, a supervised machine learning (171) can be used to train the ANN (125), as illustrated in FIG. 6. The supervised learning (171) can be used to minimize the classification differences between the predictions (179) made using the ANN (125) according to the sensor data (121) and the expected classification (177).

For example, in absence of an accident, a near accident event, or a user input indicating an abnormal condition, a classification of "normal" can be assumed. An accident, a near accident event, or a user input can be used to identify an expected classification of "abnormal" for the sensor data leading to the accident, event, or user input. The supervised machine learning (171) can be used to train the artificial neural network (125) to make the classification (179) with reduced/minimized differences from the expected classification (177).

Optionally, the inference engine (101) of the data storage device (112) can be configured to accelerate the computations of a portion of the artificial neural network (ANN) (125) implemented in the data storage device (112).

For example, the inference engine (101) can include a neural network accelerator (159) specialized to perform at least part of the computations involving the artificial neural network (ANN) (125), such as dot-product of vectors and tensors, multiply and accumulation operations, etc.

Figure 7:
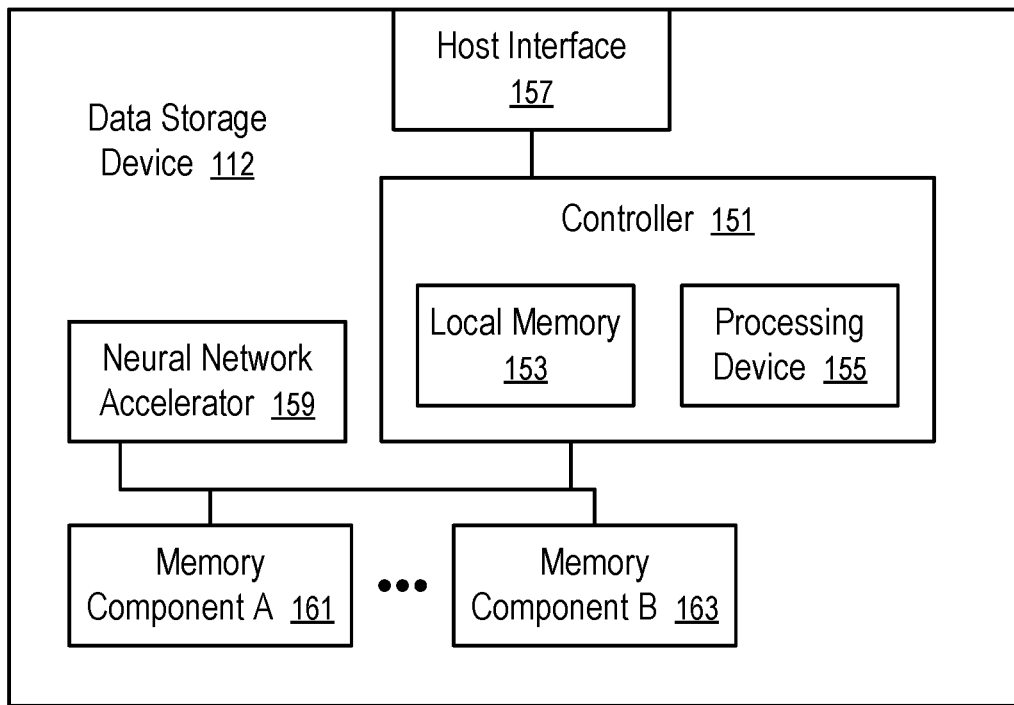
FIG. 7 shows a data storage device with a neural network accelerator according to one embodiment.

FIG. 7 shows a data storage device (112) with a neural network accelerator (159) according to one embodiment. For example, the data storage device (112) of FIG. 7 can be used in the vehicle (111) illustrated in FIG. 2 or 3.

In FIG. 7, the data storage device (112) has a host interface (157) configured to communicate with a host processor (e.g., 133 in FIG. 3). For example, the communication between the host processor (e.g., 133) and the host interface (157) can be, at least in part, in accordance with a communication protocol for a Peripheral Component Interconnect express (PCIe) bus, a Serial Advanced Technology Attachment (SATA) bus, a Universal Serial Bus (USB) bus, and/or a Storage Area Network (SAN).

For example, the host computer system (131) can communicate with the host interface (157) to retrieve inference results generated by the data storage device (112) from the input data stream (103) that contains sensor data generated by the sensors (122) of the vehicle (111).

For example, the host interface (157) can be used to receive, from the sensors (122), sensor data (121) of the vehicle (111); and the sensor data (121) can be optionally stored in the data storage device (112) for an analysis of a subsequent accident or near accident event.

In FIG. 7, each of the memory components (161 to 163) can be a memory integrated circuit configured to store data.

The neural network accelerator (159) and the controller (151) can be implemented via logic circuits formed on one or more integrated circuit dies that are stacked on the integrated circuit dies of the memory components (161 to 163). Through-silicon vias between the integrated circuit die(s) of the neural network accelerator (159) and the controller (151) and the integrated circuit dies of the memory components (161 to 163) can be used to provide high communication bandwidth for processing the data stored in the memory components (161 to 163) to generate inference results. The inference results can be stored in the local memory (153) of the controller (151) and/or some of the memory components (161 to 163) for retrieval by the host system, such as the computer system (131) of the vehicle (111). For example, different memory components (161 to 163), or different sections of a memory component (e.g., 161 or 163), can use through-silicon vias to facilitate parallel access for different portions of the neural network accelerator (159), and the controller (151).

In general, some memory integrated circuits are volatile and require power to maintain the stored data; and some memory integrated circuits are non-volatile and can retain the stored data even when not powered. The memory components (161 to 163) can include volatile memory and/or non-volatile memory. The memory components (161 to 163) can implement different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer is located above the memory element columns, and wires of the other layer is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The data storage device (112) can have a controller (151) that includes volatile local memory (153) and at least one processing device (155).

The local memory of the controller (151) can be an embedded memory configured to store instructions for performing various processes, operations, logic flows, and routines that control operation of the processing device (155), including handling communications between the data storage device (112) and the processor(s) (e.g., 133) of the vehicle (111), and other functions described herein. Optionally, the local memory (153) of the controller (151) can include Read-Only Memory (ROM) for storing micro-code and/or memory registers storing, e.g., memory pointers, fetched data, etc., and/or volatile memory, such as Dynamic Random-Access Memory (DRAM) and Static Random-Access Memory (SRAM).

In FIG. 7, the data storage device (112) includes a neural network accelerator (159) coupled to the controller (151) and/or the memory components (161 to 163).

For example, the neural network accelerator (159) can be configured to perform matrix arithmetic computations more efficiently than the processing device (155) of the controller (151). The computations involving ANN (125) have matrix multiplication and accumulation operations, which can be computational intensive for a generic processor (e.g., 133, 155). Using the neural network accelerator (159) to perform the matrix arithmetic computations can reduce the data to be transmitted to the processor(s) (133) of the vehicle (111) and reduce the computation workload for the processor(s) (133, 155).

When the ANN (125) includes a Spiking Neural Network (SNN), the simulation of the differential equation(s) for controlling the activation level of SNN neurons can be computationally intensive for a generic processor (e.g., 133, 155). Optionally, the neural network accelerator (159) can use special hardware to simulate the differential equation(s) and thus improve the computational efficiency in implementing the SNN.

In some implementations, the neural network accelerator (159) is an integrated circuit device separate from the controller (151) and/or the memory components (161 to 163). Alternatively, or in combination, a neural network accelerator (159) is integrated with the controller (151) in an integrated circuit die. Alternatively, or in combination, a portion of the neural network accelerator (159) can be integrated on the integrated circuit die(s) of at least one of the memory components (161 to 163), as illustrated in FIG. 8.

Figure 8:
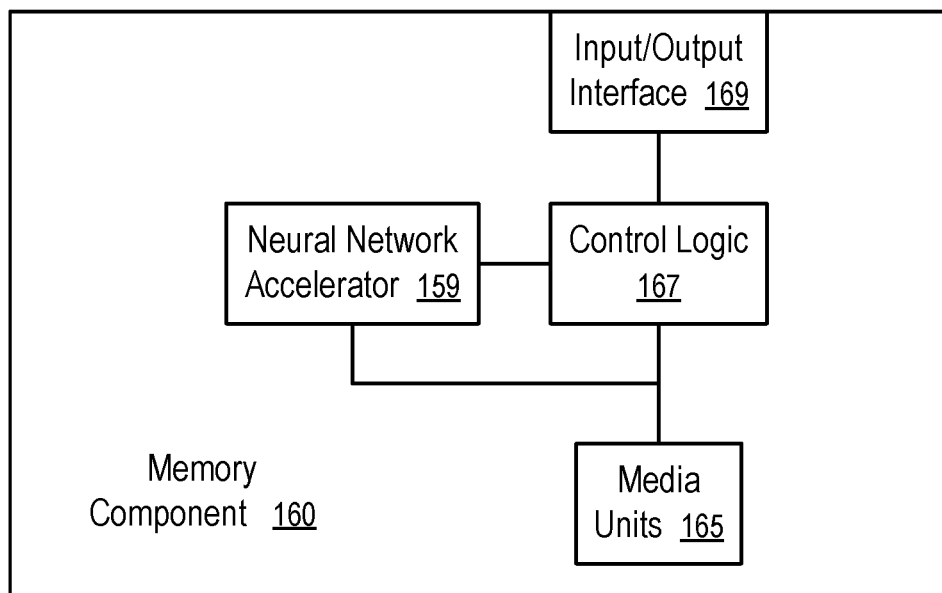
FIG. 8 shows a memory component to accelerate neural network computations according to one embodiment.

FIG. 8 shows a memory component (160) to accelerate neural network computations according to one embodiment. For example, each or some of the memory components (161 to 163) in FIG. 7 can be implemented using a memory component (160) of FIG. 8.

In FIG. 8, the memory component (160) can be formed on an integrated circuit die. An input/output (I/O) interface (169) of the memory component (160) is configured to process input/output signals for the memory component (160). For example, the input/output signals can include address signals to specify locations in the media units (165) and data signals representing data to be written in the media units (165) at the locations specified via the address signals, or data retrieved from the locations in the media units (165).

In FIG. 8, a neural network accelerator (159) is coupled with the control logic (167) and/or the media units (165) to perform computations that are used in the evaluation of the output of a portion of an ANN (125) and/or in the training of the ANN (125).

For example, the input/output interface (169) can receive addresses that identify matrices that are stored in the media units and that are to be operated upon via the neural network accelerator (159). The memory component (160) can provide the computation results of the neural network accelerator (159) as the output data responsive to the addresses, store the output data in a buffer for further operations, store the output data into a location in the media units (165) specified via the address signals. Thus, the computations performed by the neural network accelerator (159) can be within the memory component (160), which is close to the media units (165) in which the matrix data is stored.

For example, the state data of SNN neurons can be stored in the media units (165) according to a predetermined pattern. The neural network accelerator (159) can automatically update the states of the SNN neurons according to the differential equation(s) for controlling the activation level of SNN neurons over time. Optionally, the neural network accelerator (159) is configured to process spiking of neurons in the neural network. Alternatively, the neural network accelerator (159) of the data storage device (112) and/or the processor(s) (133) can be configured to process the spiking of neurons and/or accumulation of inputs to the SNN.

For example, the sensors (122) generate sensor data (e.g., images) at a predetermined frequency. Each image is stored into the memory components (161 to 163) in a cyclic way where the newest image writes over the oldest image. The memory components (161 to 163) further store a portion of ANN (125) of the vehicle (111) responsible for processing of the images from the sensors (122). The controller (151) processes the images in the memory components (161 to 163) according to the portion of ANN (125) to generate inference results. The inference results are stored in the memory components (161 to 163) and/or in the local memory (153) of the controller (151) for reading by the host system, such as the computer system (131) of the vehicle (111).

For example, the data storage device (112) receives a sensor data stream from at least one sensor (122) configured on the vehicle (111) and generate the inference results based on the sensor data stream according to the portion of ANN (125) stored in the memory components (161 to 163). A neural network accelerator (159) configured within the data storage device (112) performs at least a portion of computations based on an artificial neural network (125) and the sensor data stream.

Optionally, the neural network accelerator (159) can be configured on an integrated circuit die that is separate from a controller (151) and/or separate from the memory components (161 to 163).

Optionally, the neural network accelerator (159) can be configured on an integrated circuit die that includes a controller (151) of the data storage device (112), or memory component (160, 161 or 163) of the data storage device (112).

The neural network accelerator (159) can be configured to perform computations, such as matrix arithmetic computations for ANN and/or differential equation simulations for SNN, using data stored in the data storage device (112).

Examples of the matrix arithmetic computations include matrix multiplication and accumulation operations. After a computation to generate a result of the matrix arithmetic computations using a data stored in the data storage device (112), the neural network accelerator (159) can provide the result as output of the data storage device (112) in data retrieval operations (e.g., in response to a read command). Alternatively, or in combination, the result of the matrix arithmetic computation can be buffered in the data storage device (112) as operand for a next matrix computation performed in combination with a matrix of data retrieved from the non-volatile memory via a read command received in the host interface (157).

When the Artificial Neural Network (ANN) (125) includes a Spiking Neural Network (SNN), the neural network accelerator (159) can be configured to simulate a differential equation controlling activation levels of neurons in the Spiking Neural Network (SNN). Optionally, the memory component (160) is configured to store states of the neurons in the spiking neural network according to a predetermined pattern; and the neural network accelerator is configured to automatically update the states of the neurons over time according to the differential equation. For example, the neural network accelerator (159) can be configured to train the Spiking Neural Network (SNN) via unsupervised machine learning to detect anomaly.

The computations performed by the neural network accelerator (159) according to an Artificial Neural Network (ANN) (125) involve different types of data that have different patterns of usages of the data storage device (112).

For example, making a prediction using the Artificial Neural Network (ANN) (125) includes the use of data specifying the model of the Artificial Neural Network (ANN) (125), input data provided to the artificial neurons, and output data generated by the artificial neurons.

The memory capacity of the data storage device (112) can be partitioned into different portions for the different types of ANN-related data. The different portions can be separately configured to optimize the access and storage of the corresponding data according to their patterns of usages by the neural network accelerator (159) and/or the processor(s) (133) of the computer system (131) in which the data storage device (112) is configured.

The model of the Artificial Neural Network (ANN) (125) can include the parameters specifying the static attributes of individual artificial neurons in the ANN (125) and the neuron connectivity in the ANN (125). The model data of the ANN (125) is static and does not change during the prediction calculation made using the ANN (125). Thus, the usage pattern of the model data is mostly read. However, the model data of the ANN (125) can change when an updated ANN (125) is installed. For example, the vehicle (111) can download an updated ANN (125) from the server (119) to the data storage device (112) of the vehicle (111) to update its prediction capability. The model data of the ANN (125) can also change during or after the training of the ANN (125) using a machine learning technique (e.g., 171 or 175). It is preferred to configure a separate memory partition or region of the data storage device (112) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (125) can include external inputs and internal inputs. The external inputs are generated typically by the sensors (e.g., 122) of the vehicle (111) but not by artificial neurons in the ANN (125). The external inputs can be saved in a cyclic fashion so that the input data of the most recent time period of a predetermined length of driving can be found in the data storage device (112). Thus, it is preferred to configure a separate memory partition or region of the data storage device (112) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (125) can be buffered for further access by the neural network accelerator (159) and/or the processor(s) (133) of the computer system (131). The output data can include external outputs and internal outputs. The external inputs are generated by artificial neurons as the output from the ANN (125), such as the results of classifications or predictions made by the ANN (125). The output of the ANN (125) is typically further processed by the processor(s) (133) of the computer system (131). The external inputs may be saved periodically (e.g., in a way similar to the storing of the state variable data). The internal outputs and/or some of the external outputs can be internal inputs to artificial neurons in the ANN (125). In general, it may not be necessary to store the internal outputs from the buffer of the data storage device to the memory components. In some implementations, when the buffer capability of the data storage device (112) is insufficient to hold the entire state variable data and/or the internal outputs, the data storage device (112) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the data storage device (112). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

FIG. 9 shows a memory capacity (181) configured to support neural network computations according to one embodiment. For example, the memory capacity (181) of the memory components (161 to 163) of the data storage device (112) of FIG. 7 can be configured according to FIG. 9 to support neural network computations.

The memory capacity (181) of FIG. 9 can be implemented using a set of memory components (e.g., 161 to 163) of the data storage device (112).

A set of regions (183, 185, 187, . . . ) can be created on the memory capacity (181) of the data storage device (112). Each of the region (e.g., 183, 185, or 187) corresponds to a named portion of the memory capacity (181). Logical addresses are defined within each region. An address map (191) is configured to map between the logical addresses defined in the regions (183, 185, 187, . . . ) to the physical addresses of memory units in the memory components (e.g., 161 to 163 illustrated in FIG. 7).

The address map (191) can include region optimization settings (192) for the regions (183, 185, and 187).

For example, an ANN model region (183) can be a memory/storage partition configured for the model data of the Artificial Neural Network (ANN) (125). The region optimization settings (192) optimizes the memory operations in the ANN model region (183) according to the data usage pattern of ANN models (e.g., mostly read, infrequent update centric).

For example, a neuron input region (185) can be a memory/storage partition configured for the external input data to the Artificial Neural Network (ANN) (125). The region optimization settings (192) optimizes the memory operations in the neuron input region (185) according to the data usage pattern of the external input data (e.g., for enhanced endurance supporting cyclic overwrite of continuous input data flow for sequential writes).

For example, a neuron output region (187) can be a memory/storage partition configured for the external output data provided from the Artificial Neural Network (ANN) (125). The region optimization settings (192) optimizes the memory operations in the neuron output region (187) according to the data usage pattern of the external output data (e.g., improved endurance for periodically overwrite of data with random read/write access).

The data storage device (112) includes a buffer configured to store temporary/intermediate data of the Artificial Neural Network (ANN) (125), such as the internal inputs/outputs of the artificial neurons in the ANN (125).

Optionally, a swap region can be configured in the memory capacity (181) to extend the capacity of the buffer (152).

Optionally, the address map (191) includes a mapping between logic memory addresses received in the host interface (157) to access data of artificial neurons and the identities of the artificial neurons. Thus, a read or write command to access one type of data of an artificial neuron in one region can cause the controller 151 to access another type of data of the artificial neuron in another region.

For example, in response to a request to write external input data for a neuron into the memory capacity (181) of the data storage device (112), the address map (191) can be used to calculate the addresses of the model parameters of the neuron in the ANN model region (183) and read the model parameters into the buffer (152) to allow the neural network accelerator (159) to perform the computation of the output of the neuron. The output of the neuron can be saved in the buffer (152) as the internal input to other neurons (e.g., to reduce write amplification). Further, the identities of the other neurons connected to the neuron can also be retrieved from the ANN model region (183) into the buffer (152), which allows the neural network accelerator (159) and/or the processor to further process the propagation of the output in the ANN (125). The retrieval of the model data from the ANN model region (183) can be performed in parallel with the storing of the external input data into the neuron input region (185). Thus, the processors (133) of the computer system (131) of the vehicle (111) do not have to explicitly send in read commands for the retrieval of the model data from the ANN model region (183).

Similarly, in response to reading output data of a neuron, the address map (191) can be used to compute the addresses of the model parameters of the neuron stored in the ANN model region (183) and read the model parameters into the buffer (152) to allow the neural network accelerator (159) to apply internal inputs in the buffer (152) to the perform the computation of the output of the neuron. The computed output can be provided as a response to the reading of the output data for the neuron, without the data storage device (112) having to store the output data in the memory components (e.g., 161 to 163). Thus, the processors (133) and/or the neural network accelerator (159) can control the computations of the neuron via writing inputs to neurons and/or reading outputs from neurons.

In general, incoming external input data to the ANN (125) can be raw sensor data (121) generated directly by the sensors (e.g., 122) without processing by the processors (133) and/or the neural network accelerator (159). Alternatively, indirect sensor data (121) that has processed by the processors (133) for the ANN (125) from the signals from the sensors (122) can be provided as the external input data. The incoming external input data can be accepted in the host interface (157) and written in a cyclic way into the neuron input region (185), and automatically buffered in the buffer (152) for neural network accelerator (159) to generate neuron outputs using the model stored in the ANN model region (183). The outputs generated by the neural network accelerator (159) can be further buffered as internal inputs for further application of the model in the ANN model region (183). When the external outputs become available, the data storage device (112) can report the completion of the write requests with an indication of the availability of the external outputs. Optionally, the controller 151 and/or the neural network accelerator (159) can generate internal read commands to propagate signals in the ANN (125) in generating the external outputs. Alternatively, the host processors (133) can control the propagation of signals in the ANN (125) by selectively reading outputs of neurons; and the data storage device (112) can actively buffer data that may be needed in the buffer (152) to accelerate the ANN computation.

FIG. 10 illustrates the configuration of a memory region (183) for an Artificial Neural Network (ANN) model according to one embodiment. For example, the configuration of FIG. 10 can be implemented in the data storage device (112) of FIG. 7 with a logical memory capacity (181) of FIG. 9. For example, the settings (193) of FIG. 10 can be part of the region optimization settings (192) of FIG. 9.

The configuration of FIG. 10 maps an ANN model region (183) to at least one memory component A (161). Preferably, the at least one memory component A (161) can be used by the controller (151) in parallel with memory components (e.g., 163) that hosts the other regions (e.g., 185 and 187) of ANN data. For example, the memory component A (161) can be in an integrated circuit package that is separate from the integrated circuit packages for the other regions (e.g., 185 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 10, the settings (193) are optimized to the usage pattern of mostly read and infrequent update.

FIG. 11 illustrates the configuration of a region (185) for the inputs to artificial neurons according to one embodiment. For example, the configuration of FIG. 10 can be implemented in the data storage device (112) illustrated in FIGS. 7 and/or 9. For example, the settings (195) of FIG. 10 can be part of the region optimization settings (192) of FIG. 9.

The configuration of FIG. 11 maps a neuron input region (185) to at least one memory component B (163). Preferably, the at least one memory component B (163) can be used by the controller (151) in parallel with memory components (e.g., 161) that hosts the other regions (e.g., 183 and 187) of ANN data. For example, the memory component B (163) can be in an integrated circuit package that is separate from the integrated circuit packages for the other regions (e.g., 183 and 187). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 11, the settings (195) are optimized to the usage pattern of enhanced endurance in cyclic sequential overwrite in recording a continuous stream of input data that is sampled at a fixed time interval.

FIG. 12 illustrates the configuration of a region (187) for the outputs from artificial neurons according to one embodiment. For example, the configuration of FIG. 10 can be implemented in the data storage device (112) illustrated in FIGS. 7 and/or 9. For example, the settings (197) of FIG. 10 can be part of the region optimization settings (192) of FIG. 9.

The configuration of FIG. 12 maps a neuron output region (187) to at least one memory component C (162). Preferably, the at least one memory component C (162) can be used by the controller (151) in parallel with memory components (e.g., 161 and 163) that hosts the other regions (e.g., 183 and 185) of ANN data. For example, the memory component C (162) can be in an integrated circuit package that is separate from the integrated circuit packages for the other regions (e.g., 183 and 185). Alternatively, the memory components (161 to 163) are formed on separate integrated circuit dies embedded in a same integrated circuit package. Alternatively, the memory components (161 to 163) can be formed on separate regions of an integrated circuit die, where the separate regions can be operated substantially in parallel (e.g., for read, for erase, and/or for write).

In FIG. 12, the settings (197) are optimized to the usage pattern of buffered data for periodic overwrite with random access. For example, memory units are configured via the optimization settings (193 to 197) to update/overwrite in the neuron output region (187) at a frequency higher than in the ANN model region (183), but lower than in the neuron input region (185).

A communication protocol/interface can be configured to allow a data storage device to perform neural network acceleration on the fly with reduced data traffic to the host system.

For example, the host processor (e.g., 133) of a vehicle (111) can provide write commands to the data storage device (112) to store the model of an artificial neural network in a model partition (e.g., 183).

To use the ANN model in classifications and/or predictions, the host processor (e.g., 133) of a vehicle (111) can optionally stream input data for the ANN (125) into the neuron input partition (e.g., 185). The neural network accelerator (159) of the storage device (112) can automatically apply the images from the sensors (122) and, if there is any, the input data from the host processor (133) to the model stored in ANN model partition (e.g., 183) in accordance with the address map (191). The data storage device (112) makes the computed outputs available for propagation in the ANN (125). Preferably, the computed outputs are made available to the neural network accelerator (159) through the buffer (152) without the need to store the intermediate outputs into memory components (e.g., 161 to 163). Thus, the data communications between the host processor (e.g., 133) and the data storage device (112) for the transporting of outputs of neurons can be reduced. When the outputs have propagated to the output neurons in the ANN (125), the data storage device (112) can provide a response to a request from the host processor (e.g., 133). The response indicates that the external output from neurons in the ANN (125) is available. In response, the host processor (e.g., 133) of a vehicle (111) can optionally issue read commands to retrieve the external outputs for further processing.

Figure 13:
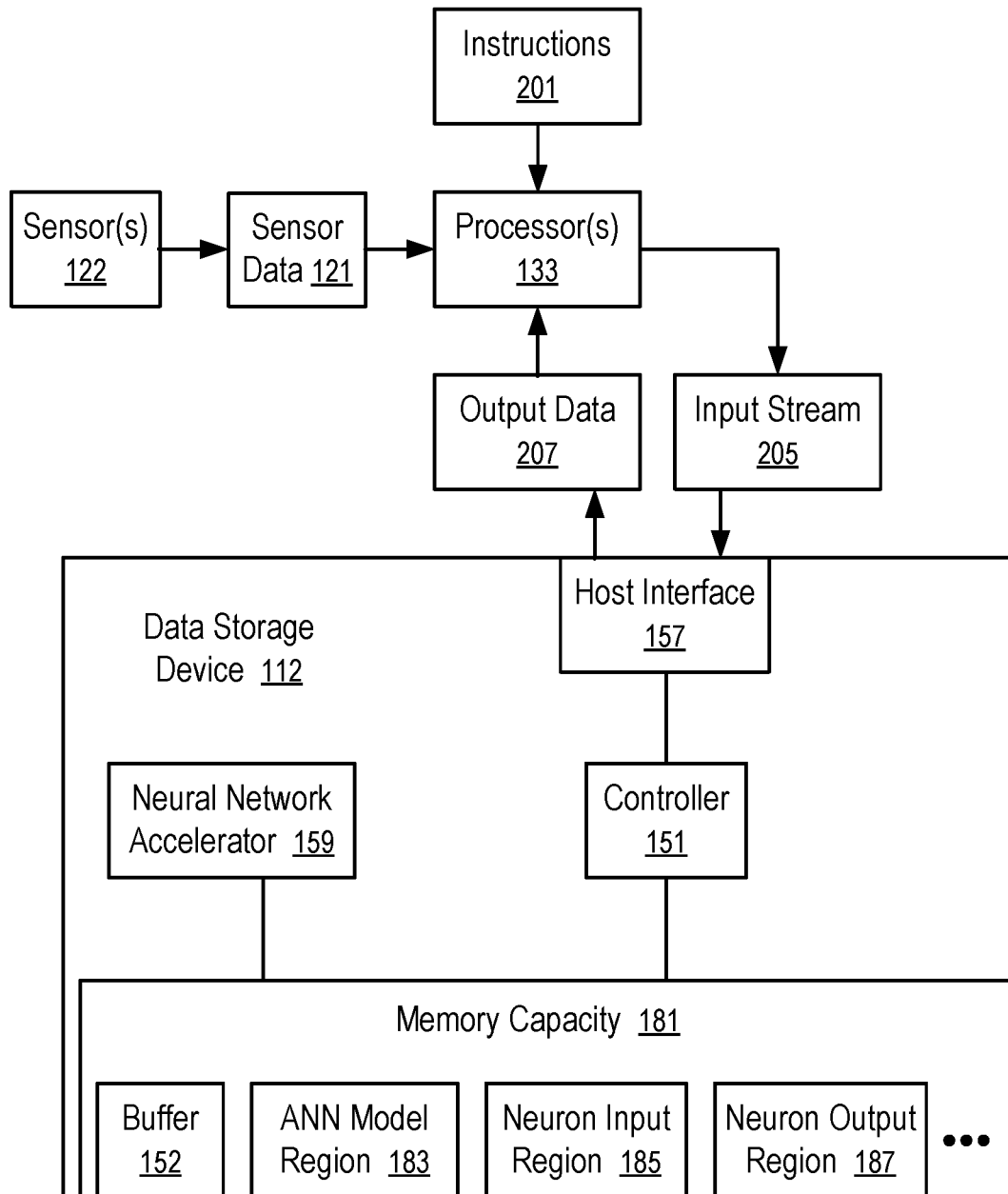
FIG. 13 shows communications between an autonomous vehicle and a data storage device according to one embodiment.

FIG. 13 shows communications between an autonomous vehicle (111) and a data storage device (112) according to one embodiment. For example, the communications as illustrated in FIG. 13 can be implemented in the vehicle (111) of FIG. 2 or 3, with a data storage device (112) illustrated in FIG. 1, or 7.

In FIG. 13, the processor(s) (133) of the host system can be configured with a simplified set of instructions (201) to perform neural network computation, since some of the computations involving the ANN (125) is performed by the neural network accelerator (159) within the data storage device (112). It is not necessary to transport the model data back to the processor(s) (133) during the use of the ANN (125) for predictions and/or classifications.

The sensors (122) can generate a continuous input stream (205) as part of sensor data (121) for the vehicle (111). The sensor data (121) in the input stream (205) can be generated at a fixed, predetermined time interval (e.g., during the operation of the vehicle (111)).

The input stream (205) is applied to input neurons in the ANN (125). Input neurons in the ANN (125) are configured to accept external inputs to the ANN (125); and output neurons are configured to provide external outputs from the ANN (125).

The processor(s) (133) can execute the instructions (201) to process the output data (207) from the data storage device (112) and some of the sensor data (121).

For example, the processor(s) (133) can write the sensor data (121) as part of the input stream (205) into the neuron input region (185) and read from the neuron output region (187) the output data (207) generated by the neural network accelerator (159) using the ANN data in the model region (183).

The data storage device (112) stores the input stream (205) into the neuron input region (185) in a cyclic way where the oldest input set corresponding to the oldest time instance of data sampling for data sets currently stored in the neuron input region (185) is erased to store the newest set of inputs.

For each input data set, the neural network accelerator (159) applies the model of the ANN (125) stored in the ANN model region (183). The neural network accelerator (159) (or the processor(s) (133)) can control the propagation of signals within the neural network. When the output neurons of the ANN (125) generate their outputs responsive to the input data set, the data storage device (112) can provide to the processor (133) an indication that the neuron outputs are ready for retrieval. The indication can be configured in a response to the request from the processor(s) (133) to write the input data set into the neuron input region (185). The processor(s) (133) can optionally retrieve the output data (207) (e.g., in accordance with conditions and/or criteria programmed in the instructions).

In some embodiments, a trigger parameter is configured in the data storage device (112). When an output parameter in the external output (217) meets a requirement specified by the trigger parameter, the data storage device provides the response to the request from the processor(s) (133) to write the input data set into the neuron input region (185).

Figure 14:
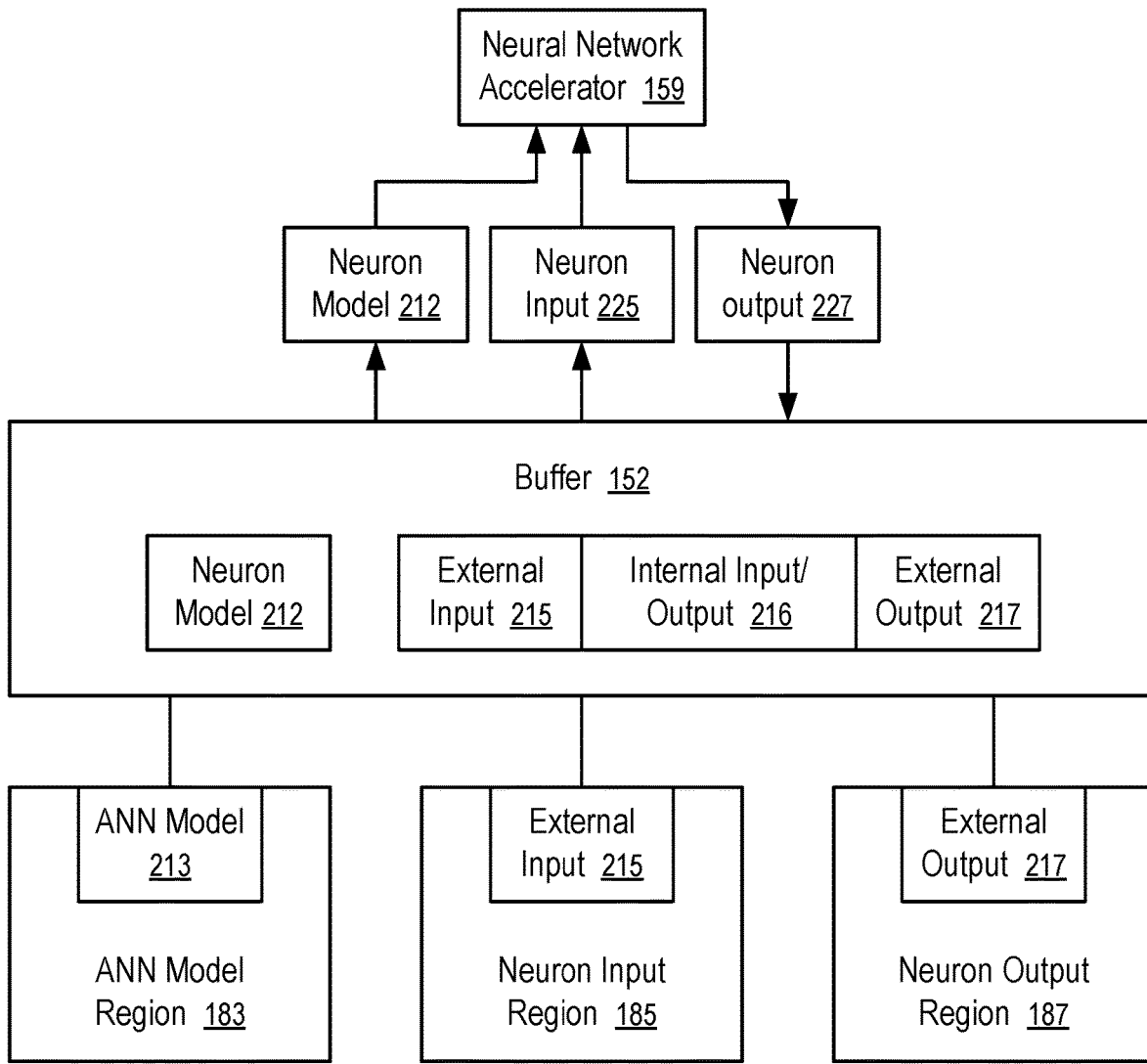
FIG. 14 shows communications within a data storage device according to one embodiment.

FIG. 14 shows communications within a data storage device (112) according to one embodiment. For example, the communications of FIG. 14 can be implemented in a data storage device (112) illustrated in FIG. 1 or 7.

In FIG. 14, the model region (183) stores the model (213) of an ANN (125). In response to receiving a set of external input (215) for a time instance from the input stream (205) in the buffer (152), the data storage device (112) can write the external input (215) into the input region (185) in parallel with retrieving a neuron model (212) containing a portion of the ANN model (213) corresponding to the parameters of the input neurons and/or the identities of neurons connected to the input neurons. The buffer (152) allows the neural network accelerator (159) to combine the neuron model (212) and the external input (225) to generate the output (227) of the input neurons.

In general, the neuron output (227) can include a portion that is the internal output (216) for further propagation within the ANN (125) and/or a portion that is the external output (217) for the processor(s) (133).

The internal output (216) is stored in the buffer (152) as internal input (216) for further propagation in the ANN (125) in a way similar to the generation of neuron outputs (227) from the external input (215). For example, a portion of the internal input (216) can cause the controller (151) and/or the neural network accelerator (159) to retrieve corresponding neuron model (212) relevant to the internal input such that the internal input is applied in the neural network accelerator (159) to the corresponding neuron model (212) to generate their neuron outputs (227).

When the complete set of external output (217) is available in the buffer (152), the external output (217) can be stored into the output region (187).

Optionally, the storage device (112) does not store each set of external output (217) corresponding to a set of stored external input (215) sampled at a time instance. For example, the storage device (112) can be configured to store one set of external output (217) every time when a predetermined number of sets of external input (e.g., 215) has been counted. Alternatively, or in combination, the processor(s) (133) can determine whether or not to store the external output (217). For example, the storage device (112) can be configured to store the external output (217) in response to the processor(s) (133) retrieving the external output (217) for further processing. For example, the storage device (112) can be configured to store the external output (217) in response to a write command from the processor(s) (133) after the processing of the external output (217) in the processor(s) (133).

Figure 15:
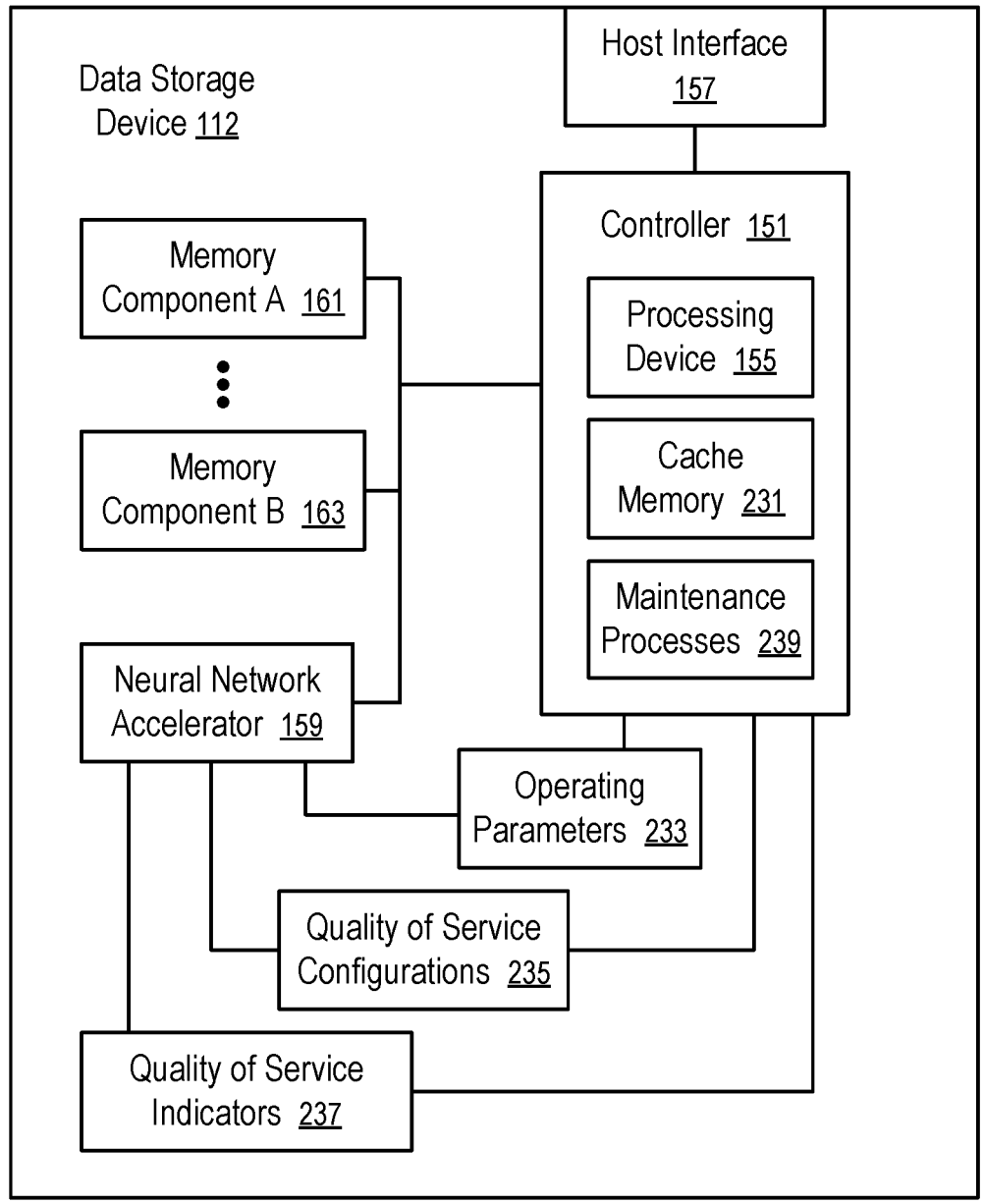
FIG. 15 shows a data storage device configured to optimize quality of service according to one embodiment.

FIG. 15 shows a data storage device (112) configured to optimize quality of service (102) according to one embodiment. For example, the data storage device of FIG. 15 can be implemented using the techniques of a data storage device (112) of FIG. 1 or 7 in a vehicle (111) illustrated in FIG. 2 or 3.

In FIG. 15, the data storage device (112) includes a cache memory (231) that is configurable via quality of service configurations (235) predicted by the neural network accelerator (159) using an ANN model (213) stored in the memory components (161 to 163).

For example, the cache memory (231) can be used to cache data that is stored in the memory components (161 to 163) and that may be subsequently used by the neural network accelerator (159) and/or the processor(s) (133) connected to the data storage device (112). For example, the cache memory (231) can be used to provide the functionality of the buffer or cache illustrated in FIGS. 12-14.

Further, the controller (151) of the data storage device (112) can run background maintenance processes (209) according to schedules predicted by the neural network accelerator (159) using an ANN model (213) stored in the memory components (161 to 163).

The ANN model (213) stored in the memory components (161 to 163) is configured to optimize the quality of service of the data storage device (112) in processing the input/output data streams (103 and 109).

The ANN model (213) is configured to predict the optimized configuration for the cache memory (231) and the optimized schedule for the maintenance processes (239) based at least in part on the operating parameters (233) of the vehicle (111) and/or the data storage device (112).

For example, the operating parameters (233) of the vehicle (111) can include a speed of the vehicle (111), a location of the vehicle (111), a roadway on which the vehicle (111) is traveling, inputs from some of the sensors (122) of the vehicle (111), inference results generated based on the inputs from some of the sensors (122), the status of vehicle controls (e.g., 141, 143, 145), the status of the components of the vehicle (111), such as the infotainment system (149)

and/or the communication device (139) of the vehicle (111). The operating parameters (233) of the vehicle (111) can include the status and operations of the Advanced Driver Assistance System (ADAS) (128) and/or other applications/components running in the vehicle (111).

For example, the operating parameters (233) of the data storage device (112) can include the sizes of queues for read commands and write commands received in the host interface, the status or milestone of the execution of the ANN model (213) in generating inference results, etc.

When controlled by a quality of service configuration (235) having a particular cache configuration for the cache memory (231) and a particular maintenance schedule for the maintenance processes (239), the controller (151) can measure its quality of service indicator (237).

At least a portion of the ANN model (213) is configured to classify the operating parameters (233) into one of a plurality of workload clusters representing the workload conditions of the data storage device (112). Each workload cluster provides a substantially consistent quality of service when a particular quality of service configuration (235) is applied. Different quality of service configurations (235) can be optimized for different workload clusters.

For example, training data can be generated by varying the quality of service configuration (235) to search for an optimized quality of service indicator (237) to a given workload cluster. Subsequently, when a workload cluster is identified for the current operating parameters (233), the previously found optimized service configuration (235) can be used.

For example, during a training period, the data storage device (112) can measure the quality of service indicators (237) associated with different quality of service configurations (235) and different operating parameters to generate a training data set. The ANN (125) can self-organize the training data set to identify workload clusters. Subsequently, a current set of operating parameters (239) can be classified into one of the workload clusters; and different quality of service configurations (235) for the identified workload cluster are associated with different quality of service indicators (237). Thus, one of the quality of service configurations (235) that is associated with the optimized one of the associated quality of service indicators (237) can be selected for controlling the cache memory (231) and the maintenance processes (239).

Optionally, after a workload cluster is identified, the controller (151) can vary the quality of service configuration (235) used to control the cache memory (231) and the maintenance processes (239), measure the corresponding quality of service indicators (237), and search/determine the optimized quality of service configuration such that the ANN (125) is updated to predict the optimized quality of service configuration for the workload cluster.

The self-training capability of the ANN (125) in predicting the optimized quality of service configuration (235) allows the data storage device (112) to adapt to its routine usages and gradually improve its quality of service (102) over a period of time of routine usages.

A quality of service configuration (235) of the data storage device (112) can include an identification of a caching strategy selected from a plurality of caching strategy candidates that can be implemented for the cache memory (231), cache size, cache block size, cache set size, number of cache sets, timing and frequency of the maintenance processes (239), etc.

The controller (151) of the data storage device (112) can provide operating parameters (233) that are indicative of a data access pattern in the data storage device (112).

Examples of the operating parameters (233) can include an operating parameter of the data storage device (112), such as the status and operation of the neural network accelerator (159), commands queued in the data storage device (112) for execution, status of background operations to be performed and/or being performed in the data storage device (112), etc.

Examples of the operating parameters (233) can include inference results generated from the input data stream (103) and/or provided in the output data stream (109).

Examples of the operating parameters (233) can include an operating parameter received in the input data stream (103) from a host system of the data storage device (112), such as a speed of the vehicle (111), a location of the vehicle (111), the identification of a roadway (114) on which the vehicle (111) is traveling, the status of vehicle controls (e.g., 141, 143, 145), the operation status of the components of the vehicle (111), such as the infotainment system (149) and/or the communication device (139) of the vehicle (111), the operation status of the Advanced Driver Assistance System (ADAS) (128) and/or other applications/components running in the vehicle (111).

Figure 16:
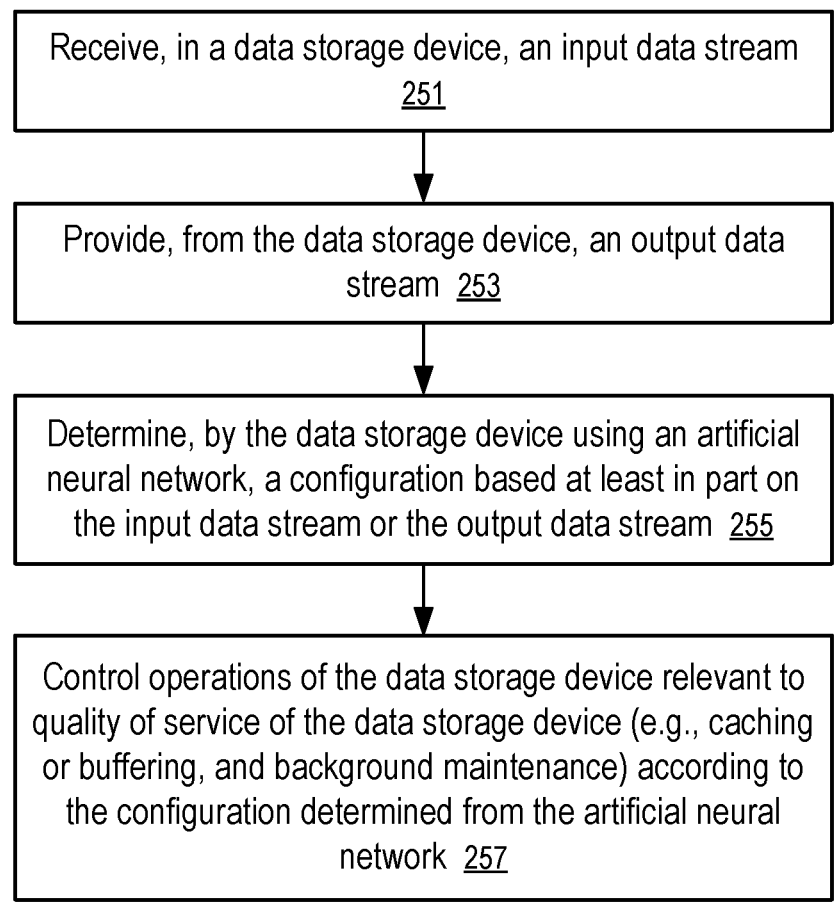
FIG. 16 shows a method to control quality of service of a data storage device according to one embodiment.

FIG. 16 shows a method to control quality of service of a data storage device according to one embodiment. For example, the method of FIG. 16 can be implemented in a data storage device (112) of FIG. 1, 7, 13 or 15 in connection with a computer system (131) or ADAS (128) of FIG. 3 in a vehicle (111) of FIG. 2 or 3.

At block 251, the data storage device (112) receives an input data stream (103).

For example, the input data stream (103) can include sensor data (121) generated by the sensors (122) of an autonomous vehicle (111).

For example, the input data stream (103) can include operating parameters of the vehicle (111), such as a speed of the autonomous vehicle (111), a location of the autonomous vehicle (111), a status of a vehicle control (e.g., 141, 143, 145), a status of an infotainment system (149) of the autonomous vehicle (111), or a status of an advanced driver assistance system (128) of the autonomous vehicle (111), etc.

At block 253, the data storage device (112) provides an output data stream (109).

For example, the output data stream (109) can include inference results generated by the inference engine (101) of the data storage device (112) based on the input data stream (103).

At block 255, the data storage device (112) determines, using an artificial neural network (125), a configuration (235) based at least in part on the input data stream (103) or the output data stream (109).

At block 257, a controller (151) of the data storage device (112) controls operations of the data storage device (112) that are relevant to quality of service of the data storage device (112) according to the configuration (235) determined from the artificial neural network (125). Such operations controlled according to the configuration (235) can include caching or buffering (106), and background maintenance (e.g., garbage collection (107), wear leveling (108)).

For example, the configuration (235) can identify a schedule (e.g., timing and frequency) of the background maintenance, such as garbage collection (107), or wear leveling (108).

For example, the configuration (235) can identify an identification of a caching strategy selected from a plurality of caching strategies, or a size for caching, or a combination thereof.

For example, the data storage device (112) can use an artificial neural network (125) to generate inference results from the input data stream; and the configuration (235) can be determined based at least in part on the inference results.

For example, the data storage device (112) can identify operating parameters representing a workload condition of the data storage device, classify the operating parameters into a workload cluster using the artificial neural network (125), and determine the configuration (235) based on an identification of the workload cluster.

For example, the data storage device (112) can select the configuration (235) from a plurality of configurations by optimizing quality of service of the data storage device (112) working in the workload cluster.

Optionally, the data storage device (112) can search for the optimized configuration (235) by varying configurations used to control the operations of the data storage device (112) and measuring a quality of service indicator (237) of the data storage device (112) while varying the configurations to maximize the measured quality of service indicator (237).

Optionally, the data storage device (112) can train the artificial neural network to predict the optimized configuration (235) based on the identification of the workload cluster from the operating parameters of the data storage device (112), the input data stream (103), and/or the output data stream (109).

When the input data stream (103) includes sensor data (121) from one or more sensors (122) of an autonomous vehicle (111), the output data stream (109) can include computing results generated by the data storage device (112) from the sensor data; and the workload cluster can be identified based at least in part on the computing results, and the operating parameters (233) of the autonomous vehicle identified in the input data stream (103).

For example, the data storage device (112) can include a host interface (157) configured to receive the input data stream (103) and provide the output data stream (109). One or more memory components (161 to 163) of the data storage device (112) can be configured to store data in response to write commands received in the host interface (157). An inference engine (101) of the data storage device (112) can be configured to determine, using an artificial neural network (125), the optimized quality of service configuration (235) and/or inference results provided in the output data stream (109). A controller (151) of the data storage device (112) is configured to control caching/buffering (106), garbage collection (107), and wear leveling (108) according to the optimized quality of service configuration (235). The artificial neural network (125) used to determine the optimized quality of service configuration (235) can include a spiking neural network. The inference engine (101) can include a neural network accelerator (159) that is configured to perform matrix arithmetic computations more efficiently than the controller (151).

Such a data storage device (112) can be configured in a computer system (131) of a vehicle (111) having a set of sensors (122). Based on the sensor data (121) from the sensors (121) and/or the output stream (109), the computer system (131) generates signals for various controls (e.g., 141, 143, 145) of the vehicle (111) during autonomous driving.

The server (119), the computer system (131), and/or the data storage device (112) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system (e.g., a computer system (131) in a vehicle (111), a server (119), a system having processor(s) (133), a device (112) having an inference engine (101) and/or a controller (151)) causes the system to perform various methods. The executable software and data may be stored in various places including for example ROM, volatile RAM, non-volatile memory and/or cache (e.g., media (105), memory (135), data storage device (112), cache memory (231), buffer (152)). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, in a data storage device, an input data stream;
providing, from the data storage device, an output data stream;
determining, by the data storage device using an artificial neural network, a configuration based at least in part on the input data stream or the output data stream, wherein the configuration includes a caching or buffering scheme or parameter; and
controlling caching or buffering operations of the data storage device relevant to quality of service of the data storage device according to the configuration, including the caching or buffering scheme or parameter, determined from the artificial neural network.

2. The method of claim 1, wherein the configuration identifies a schedule of the background maintenance.

3. The method of claim 2, wherein the background maintenance includes garbage collection and wear leveling.

4. The method of claim 3, wherein the schedule of the background maintenance includes timing or frequency of the background maintenance.

5. The method of claim 4, wherein the configuration identifies an identification of a caching strategy selected from a plurality of caching strategies, or a size for caching, or a combination thereof.

6. The method of claim 1, further comprising:
generating, by the data storage device using an artificial neural network, inference results from the input data stream;
wherein the configuration is determined based at least in part on the inference results.

7. The method of claim 1, further comprising:
identifying operating parameters representing a workload condition of the data storage device; and
classifying the operating parameters into a workload cluster using the artificial neural network, wherein the configuration is determined based on an identification of the workload cluster.

8. The method of claim 7, further comprising:
selecting, by the data storage device, the configuration from a plurality of configurations to optimize quality of service of the data storage device for the workload cluster.

9. The method of claim 7, further comprising:
searching, by the data storage device, the configuration to optimize quality of service of data storage device by varying configurations used to control the caching or buffering operations of the data storage device; and
measuring a quality of service indicator of the data storage device in varying the configurations.

10. The method of claim 7, further comprising:
training, in the data storage device, the artificial neural network to predict the configuration based on the workload cluster.

11. The method of claim 7, wherein the input data stream includes sensor data from one or more sensors of an autonomous vehicle; and the output data stream includes computing results generated by the data storage device from the sensor data.

12. The method of claim 11, wherein the workload cluster is identified based at least in part on the computing results, and operating parameters of the autonomous vehicle identified in the input data stream.

13. The method of claim 12, wherein the operating parameters of the autonomous vehicle include a speed of the autonomous vehicle, a location of the autonomous vehicle, an input from a sensor configured on the autonomous vehicle, a status of a vehicle control, a status of an infotainment system of the autonomous vehicle, or a status of an advanced driver assistance system of the autonomous vehicle, or any combination thereof.

14. A data storage device, comprising:
a host interface configured to receive an input data stream and provide an output data stream;
one or more memory components configured to store data in response to write commands received in the host interface;
an inference engine configured to determine, using an artificial neural network, a quality of service configuration; and
a controller configured to control wear leveling operations of the data storage device relevant to quality of service of the data storage device according to the quality of service configuration determined from the artificial neural network.

15. The data storage device of claim 14, wherein the artificial neural network includes a spiking neural network.

16. The data storage device of claim 15, wherein the data storage device is configured in a vehicle; and the configuration is determined based at least in part on operating parameters of the vehicle.

17. The data storage device of claim 15, wherein the inference engine includes a neural network accelerator configured to perform matrix arithmetic computations more efficiently than the controller.

18. A vehicle, comprising:
a set of sensors configured to generate sensor data; and
a computer system configured to generate, based on the sensor data, control signals for the vehicle in autonomous driving, the computer system including a data storage device, the data storage device comprising:
one or more memory components;
a host interface configured to receive an input data stream containing the sensor data and provide an output data stream used by the computer system to generate the control signals;
an inference engine configured to determine, using an artificial neural network, at least a portion of the output data stream and a configuration; and
a controller configured to control operations of the data storage device relevant to quality of service of the data storage device according to the configuration determined from the artificial neural network, wherein the operations include caching or buffering, and wear leveling.

19. The vehicle of claim 18, wherein the artificial neural network includes a spiking neural network; and the data storage device is further configured to generate training data and train the spiking neural network to generate the configuration.

20. The vehicle of claim 19, wherein the input data stream includes operating parameters of the vehicle; and the configuration is determined based at least in part on the operating parameters.

* * * * *